United States Patent
Song et al.

(10) Patent No.: US 8,286,079 B2
(45) Date of Patent: Oct. 9, 2012

(54) CONTEXT AWARE USER INTERFACE FOR MEDICAL DIAGNOSTIC IMAGING, SUCH AS ULTRASOUND IMAGING

(75) Inventors: Tai-kyong Song, Seoul (KR); Gi-duck Kim, Incheon (KR); Dongwong Kim, Allentown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 679 days.

(21) Appl. No.: 11/524,066

(22) Filed: Sep. 19, 2006

(65) Prior Publication Data

US 2008/0072151 A1    Mar. 20, 2008

(51) Int. Cl.
*G06F 3/048* (2006.01)
*G06F 3/041* (2006.01)
*A61B 8/14* (2006.01)
*G06K 9/00* (2006.01)

(52) U.S. Cl. ........ 715/708; 715/764; 715/810; 715/784; 600/440; 600/437; 600/443; 382/132; 345/173

(58) Field of Classification Search ................. 715/708, 715/705; 382/132; 345/173; 600/440, 437, 600/443
See application file for complete search history.

(56) References Cited

U.S. PATENT DOCUMENTS

| | | | | |
|---|---|---|---|---|
| 5,161,535 A * | 11/1992 | Short et al. | .................... | 600/437 |
| 5,920,317 A * | 7/1999 | McDonald | .................... | 715/853 |
| 5,999,702 A * | 12/1999 | Brown et al. | ................... | 358/1.6 |
| 6,039,047 A * | 3/2000 | Rock et al. | .................... | 128/897 |
| 6,063,030 A * | 5/2000 | Vara et al. | ...................... | 600/437 |
| 6,126,608 A * | 10/2000 | Kemme et al. | ................. | 600/459 |
| 6,135,958 A | 10/2000 | Mikula-Curtis et al. | | |
| 6,248,073 B1 * | 6/2001 | Gilbert et al. | ................... | 600/447 |
| 6,475,146 B1 | 11/2002 | Frelburger et al. | | |
| 6,544,178 B1 * | 4/2003 | Grenon et al. | ................. | 600/443 |
| 6,599,244 B1 * | 7/2003 | Epps et al. | ..................... | 600/437 |
| 6,638,223 B2 * | 10/2003 | Lifshitz et al. | ................... | 600/440 |
| 6,692,441 B1 * | 2/2004 | Poland et al. | ................... | 600/443 |
| 6,925,200 B2 * | 8/2005 | Wood et al. | ................... | 382/132 |
| 7,072,501 B2 * | 7/2006 | Wood et al. | ................... | 382/132 |
| 7,106,479 B2 * | 9/2006 | Roy et al. | ..................... | 358/3.27 |
| 7,117,504 B2 * | 10/2006 | Smith et al. | .................... | 719/328 |
| 7,130,457 B2 * | 10/2006 | Kaufman et al. | ............. | 382/128 |
| 7,173,604 B2 * | 2/2007 | Marvit et al. | ................. | 345/156 |
| 7,549,961 B1 * | 6/2009 | Hwang | ......................... | 600/440 |
| 7,597,663 B2 * | 10/2009 | Wang et al. | .................... | 600/437 |
| 7,648,461 B2 * | 1/2010 | Thiele | .............. | 600/453 |
| 7,698,142 B2 * | 4/2010 | Washburn et al. | ............ | 704/275 |
| 2002/0070970 A1 * | 6/2002 | Wood et al. | ................... | 345/766 |
| 2002/0097902 A1 * | 7/2002 | Roehrig et al. | ................ | 382/132 |
| 2004/0109028 A1 | 6/2004 | Stern et al. | | |
| 2005/0049506 A1 | 3/2005 | Jackson et al. | | |
| 2005/0154305 A1 * | 7/2005 | Kamiyama | ................... | 600/443 |

(Continued)

OTHER PUBLICATIONS

U.S. Appl. No. 11/009,502, filed Dec. 10, 2004.

(Continued)

*Primary Examiner* — Mark Rinehart
*Assistant Examiner* — Erik Stitt

(57) ABSTRACT

User interaction is provided for a medical imaging system. The user interacts with the display rather than programmed buttons. The context between the user input and the display, such as identifying user selection of a bottom edge of a displayed image, is determined. The imaging system is controlled based on the context, such as altering the depth of imaging as the user drags the selected bottom edge up or down on the screen.

10 Claims, 2 Drawing Sheets

U.S. PATENT DOCUMENTS

| | | | |
|---|---|---|---|
| 2005/0187474 A1* | 8/2005 | Kwon | 600/437 |
| 2005/0281444 A1* | 12/2005 | Lundberg et al. | 382/128 |
| 2006/0025679 A1* | 2/2006 | Viswanathan et al. | 600/424 |
| 2006/0253030 A1* | 11/2006 | Altmann et al. | 600/466 |
| 2006/0274046 A1* | 12/2006 | Hillis et al. | 345/173 |
| 2008/0072151 A1* | 3/2008 | Song et al. | 715/708 |
| 2009/0043195 A1* | 2/2009 | Poland | 600/437 |
| 2009/0161938 A1* | 6/2009 | Shekhar et al. | 382/131 |

OTHER PUBLICATIONS

U.S. Appl. No. 11/076,619, filed Mar. 10, 2005.

* cited by examiner

CONTEXT AWARE USER INTERFACE FOR MEDICAL DIAGNOSTIC IMAGING, SUCH AS ULTRASOUND IMAGING

BACKGROUND

The present embodiments relate to user interfaces for medical imaging. In particular, medical imaging systems are adjusted based on user input.

User interfaces for medical diagnostic imaging systems may include tens of button inputs. For example, many medical imaging systems are controlled with QWERTY keyboards and pointer input devices, such as associated with a personal computer or workstation. As another example, many medical imaging systems include system specific buttons, such as an ultrasound system including both QWERTY keyboard and ultrasound specific buttons, knobs and sliders. Touch screens have allowed medical imaging systems to provide for programmable or soft buttons, allowing some reduction in dedicated inputs or limiting use of the QWERTY keyboard.

To operate the medical imaging system, the user may need knowledge of many specific buttons or functions assigned to general buttons. For example, medical diagnostic ultrasound systems may include a transducer array, a transmit beamformer, a receive beamformer, a B-mode detector, a Doppler detector, a signal processor, a scan converter, and one or more filters. A user obtains the optimal image by setting the transmit waveform, scan pattern, mode setting, depth, gain, brightness, frame rate, level of filtering, type of filtering, and other types of parameters. User selectable menus and button combinations configure the imaging systems with settings for many different imaging parameters.

Programmable display based buttons or preset groupings of parameter settings may simplify user input by more conveniently identifying settings appropriate for a current configuration. However, programmable display buttons may still require specific knowledge about the corresponding operation of the imaging system. Users may find operating the medical imaging system even more difficult during actual imaging, such as during real-time ultrasound imaging.

Further inputs are provided for measurements. In addition to optimizing the system for imaging, distance, area or volume measurements may be desired for diagnosis. The user operates even further controls to trigger the measurements. For example, the user operates a button to indicate a distance measurement. The user then selects two locations on a displayed image, and the system determines the patient relative distance between the two locations.

User control may be more difficult for smaller imaging systems. For example, handheld ultrasound imaging devices may have less space for user controls and displayed soft buttons. A more hierarchal menu structure may be provided, resulting in increased navigation time to configure or adjust imaging.

BRIEF SUMMARY

By way of introduction, the preferred embodiments described below include methods, computer readable media and systems for user interaction with a medical imaging system. The user interacts with the display rather than programmed buttons. The context between the user input and the display, such as identifying user selection of a bottom edge of a displayed image, is determined. The imaging system is controlled based on the context or association, such as altering the depth of imaging as the user drags the selected bottom edge up or down on the screen.

In a first aspect, a method is provided for user interaction with a medical imaging system. A screen has a medical image. User input associated with a location on the screen is received. The location is free of a display of a user input option. The user input is associated with context of the screen at the location. Operation of the medical imaging system is set as a function of the association of the user input with the context.

In a second aspect, a computer readable storage medium has stored therein data representing instructions executable by a programmed processor for user interaction with a medical imaging system. The storage medium includes instructions for receiving user input associated with a display of a medical image and a background, the background having text associated with a setting of the medical imaging system for having acquired the medical image, relating the user input to context of the display, and controlling the medical imaging system as a function of the user input and the context.

In a third aspect, a user input system is provided for user interaction with a medical diagnostic ultrasound imaging system. A display is operable to display a medical diagnostic ultrasound image representing a region of a patient. The medical diagnostic ultrasound image is associated with a first configuration of the medical diagnostic ultrasound imaging system. A processor is operable to alter operation of medical diagnostic ultrasound imaging system to a second configuration different from the first configuration. The processor is operable to alter as a function of input from a user input device indicating selection of at least a portion of the medical diagnostic ultrasound image.

The present invention is defined by the following claims, and nothing in this section should be taken as a limitation on those claims. Further aspects and advantages of the invention are discussed below in conjunction with the preferred embodiments and may be later claimed in combination or independently.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A context awareness-based interface allows control of a medical imaging system, such as a diagnostic medical ultrasound imaging system. The user interface recognizes user input relative to the context of a displayed screen, allowing automatic recognition of the user's intended adjustment. In a touch screen example, the user touches a bottom of a displayed image. The system changes the depth in response to selection of the bottom edge of the image. In another example, a circular motion or symbol drawn by the user near or at a center of a medical image indicates change in the gain, such as B-mode gain. Another example includes the user indicating placement of a region, such as a rectangle, over a portion of a medical image. Based on that input alone or further input, the imaging system zooms into the selected region or operates in a color or flow mode for the selected region.

Figure 1:
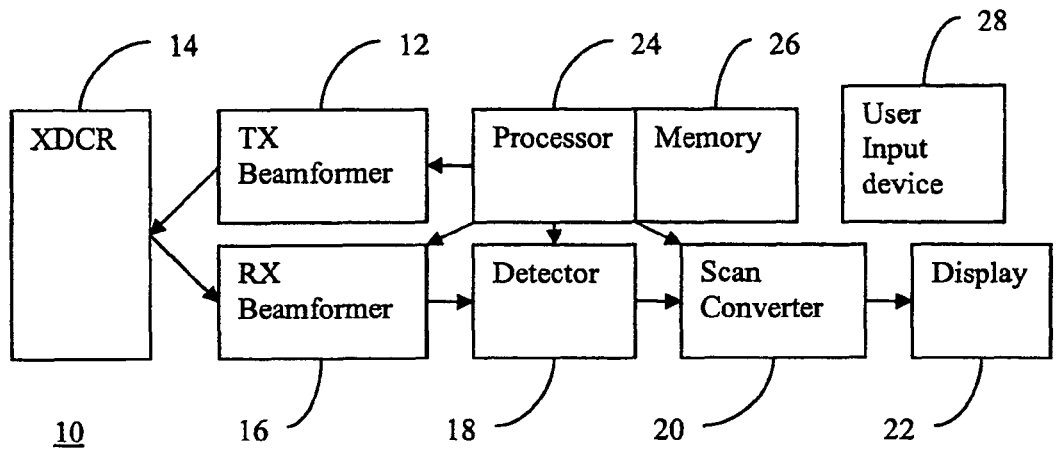
FIG. 1 is a block diagram of an ultrasound embodiment of a user input system.

FIG. 1 shows a user input system 10 for user interaction with a medical diagnostic ultrasound imaging system according to one embodiment. Other imaging systems may be used, such as x-ray, mammography, magnetic resonance (MRI), computed tomography (CT), positron emission (PET), combinations thereof, or other now known or later developed medical imaging system. The imaging system is operable to acquire images representing a region of a patient. Alternatively, the imaging system is a workstation, computer, PACs device or other system operable to perform image processing from previously acquired images. The user input system 10 operates with any type of medical imaging system, or other imaging systems.

In the ultrasound embodiment of FIG. 1, the user input system 10 is included with the ultrasound imaging system. The ultrasound imaging system has a transmit beamformer 12, a transducer 14, a receive beamformer 16, a detector 18, and a scan converter 20. Additional, different, or fewer components may be provided. In one embodiment, the ultrasound imaging system is a cart based ultrasound system. In other embodiments, the ultrasound imaging system is handheld, briefcase, wearable, or other carriable system.

The transmit beamformer 12 generates waveforms with relative delays and apodization. The transducer 14 generates acoustic beams from the waveforms. The aperture, transmit sequence, scan pattern, delays, apodization, waveform, transmit frequency, transmit bandwidth, beam shape, beam size, beam focus, beam angle, beam origin, beam intensity, scan region width, or other characteristics may be programmable. The transducer 14 converts acoustic echoes into electrical energy for use by the receive beamformer 16. The overall gain, dynamic range, receive frequency, receive bandwidth, depth gain, aperture, scan pattern, beam angle, beam origin, receive sequence, receive weighting, beam combinations, beam interpolation, delays, apodization, baseband filter characteristic, beam focus, depth, scan region width, or other characteristics of the receive beamformer operation may be programmable. The beamformed signals are detected by the detector 18. The detector 18 is a B-mode, Doppler flow, and/or spectral Doppler detector. The clutter frequency, thresholds, detection technique, filtering, gain, or other characteristics of the detector 18 may be programmable. The scan converter 20 alters the detected data from an acquisition grid (e.g., polar coordinate) to a display grid (e.g., Cartesian coordinate). The type of interpolation or other characteristics of the scan conversion may be programmable. Other operation may be programmable, such as persistence filtering, spatial filtering, edge enhancement filtering, frame rate, presets of multiple parameters, and/or other image processes.

Various programmable parameters are mentioned above for ultrasound imaging. Other ultrasound imaging parameters may be programmable, including parameters for acquiring ultrasound data and/or parameters for processing already acquired ultrasound data. Acquisition and/or image processing parameters for other types of systems may be used, such as parameters for x-ray, CT, PET, or MRI. The parameters may be now known or later developed.

The medical imaging system operates pursuant to the user input system 10. In one embodiment, the user input system 10 is part of the medical imaging system, such as sharing the input device 28, display 22 and/or processor 24. In other embodiments, the user input system 10 or a portion of the system 10 is separate from the imaging system. The user input system 10 includes a display 22, a processor 24, and a user input device 28. Additional, different, or fewer components may be provided, such as also including a memory 26.

The user input device 28 is a keyboard (e.g., QWERTY keyboard), microphone, trackball, mouse, touch screen, buttons, knobs, sliders, touch pad, optical sensor, combinations thereof, or other now known or later developed input device. In one embodiment, the user input device 28 is a touch screen of a monitor or handheld device. In another embodiment, the user input device 28 is a pointer device (e.g., trackball or mouse) and associated activation button or buttons. In other embodiments, the user input 28 includes a microphone for voice recognition and/or a pressure or touch pad for handwriting recognition.

The display 22 is a projector, monitory, CRT, LCD, plasma, or other now known or later developed display device. For example, the display 22 is a touch screen also used for the user input device 28. In other examples, the display 22 is separate from the user input device 28.

Figure 3:
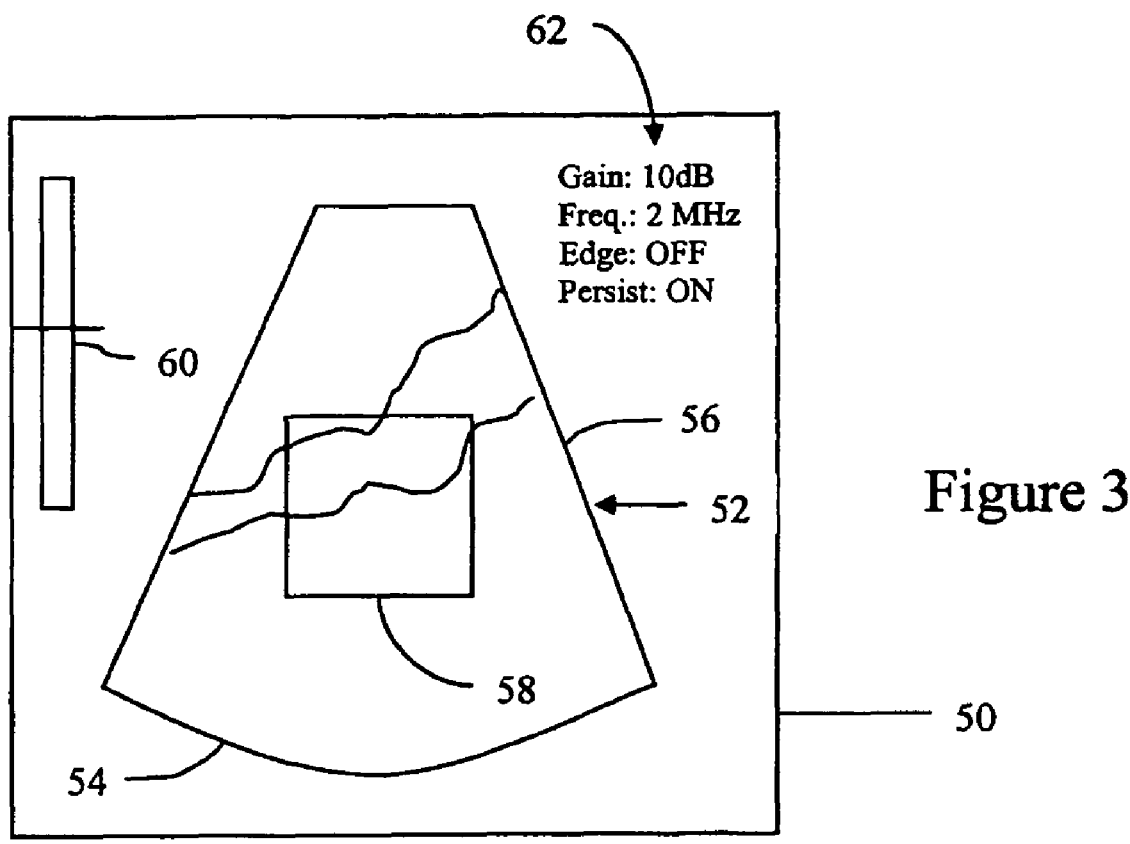
FIG. 3 is a graphical representation of one embodiment of a display or screen.

The display 22 displays a medical image, such as a medical diagnostic ultrasound, x-ray, CT, MRI, or PET image representing a region of a patient. The image is color, black-and-white, or both. The image is a two or three-dimensional representation of the region. The image is displayed alone or without further information. Alternatively, the image and/or background adjacent the image includes text or graphical overlays. FIG. 3 shows one example ultrasound screen 50 including the image 52.

The medical image and corresponding text and/or graphical overlays are associated with a configuration of the medical imaging system. Different acquisition settings, image processing settings or both are used to provide the medical image. The text and/or graphical overlays may indicate some or all of the image parameter settings used to provide the medical image.

The memory 26 stores the medical image data. Any text, graphic, and/or background information is stored with or separately from the medical image data, such as storing a screen shot without separable data structures. Alternatively, the text, graphic, and/or background information are not stored. In other embodiments, the memory 26 stores data used to generate the medical image, text, or other information.

Alternatively or additionally, the memory 26 is a computer readable storage medium having stored therein data representing instructions executable by the programmed processor 24. The instructions are for user interaction with a medical imaging system. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

The processor 24 is a general processor, digital signal processor, control processor, application specific integrated circuit, field programmable gate array, digital circuit, analog circuit, combinations thereof, or any other now known or later developed control device. The processor 24 controls operation of the imaging system. The control is by outputting queries, instructions, data, control or other signals. By controlling the imaging system, the processor 24 is operable to alter operation of medical imaging system. The imaging system alters from one configuration to another configuration. One or more imaging parameters are set differently, resulting in different configurations.

The processor 24 operates the user input device 28 and/or receives data from the user input device 28. The processor 24 alters imaging parameters as a function of input from the user input device 28. In response to a user indicating selection of at least a portion of the medical diagnostic ultrasound image in one example, the context of the indication is used to determine which imaging parameter to alter. Based on the context, a difference between configurations corresponds to the portion of the medical image selected by the user. Further examples are provided below with the discussion of FIG. 2.

Figure 2:
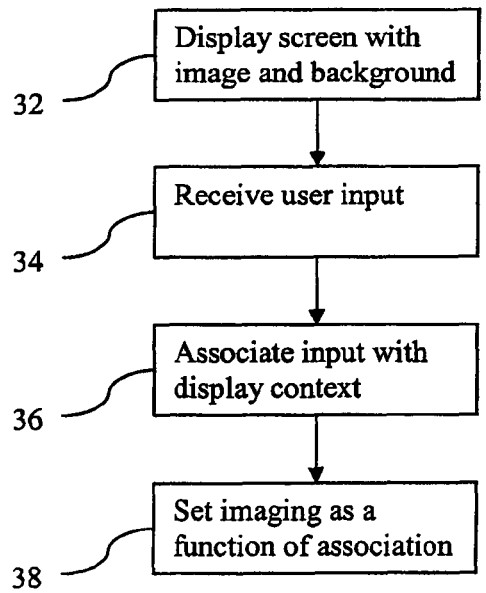
FIG. 2 is a flow chart diagram of one embodiment of a method for user interaction with a medical imaging system.

FIG. 2 shows one embodiment of a method for user interaction with a medical imaging system. The method uses the user input system 10 and/or medical imaging system of FIG. 1 or different systems. The method is performed in the order shown, but other orders may be provided. Additional, different, or fewer acts may be used.

In act 32, a screen with a medical image is displayed. For example, FIG. 3 shows a displayed screen 50 with a medical diagnostic ultrasound image 52. The medical image 52 includes a bottom edge 54, sides 56, and a top. Any shape may be provided, such as sector, Vector®, or linear. The medical image represents a region of the patient, such as a vessel, organ, tissue, and/or fluid. More than one medical image 52 may be provided on the screen 50.

The medical image 52 may include graphics and/or text. For example, a box 58 representing a color pan box or region of interest is displayed. The box 58 may represent other settings, such as scan pattern (e.g., Doppler transmission and reception in the box 58), detection type (e.g., velocity or energy of flow), and/or other settings.

The screen 50 also includes a background around and/or within the image 52. In the example of FIG. 3, the background includes a color or gray scale 60 associating color, brightness, and/or other display characteristic of the medical image 52 with data (e.g., velocity scale).

The background also includes text 62 in the example of FIG. 3. The text 62 indicates one or more settings for imaging parameters. The settings are current or previous settings associated with the medical image 52. For example, the medical image 52 on the screen 50 was acquired at a 2 MHz imaging frequency, a gain of 10 dB, with persistence filtering on, and with edge filtering off. The settings for having acquired the medical image 52 are displayed to assist in diagnosis. Any of the parameters discussed above or available in a system may be displayed as text in the background or over the medical image 52.

Some of the settings may not be displayed. Other settings may be represented by the medical image 52, such as the depth corresponding to the bottom edge 54 or the scan pattern corresponding to the sides 56.

The screen 50 may be frozen or substantially continuously display a same image 52. Alternatively, the screen 50 updates to display a sequence of images 52. The images 52 of the sequence are acquired or generated with the same or different settings of imaging parameters.

Referring again to FIG. 2, user input is received in act 34. The user input is associated with one or more locations on the screen 50. Using a pointer and/or touch position, a location is identified on the screen 50. Alternatively, button navigation of a cursor or other user input indicates one or more locations on the medical image 52 and/or the background.

In one embodiment, the display includes a soft button representation (e.g., visually raised object soliciting or indicating input), a selectable indication (e.g., tabs, check boxes, menu selection, or other indication of user input selection options), and/or text entry (e.g., text box). The user may select the input option solicited by the display for controlling imaging processing. Alternatively, the entire display and/or the location selected by the user are free of such displayed user input options.

In one embodiment, the user input location on the display or screen 50 is free of a display of a user input option, such as being free of a displayed soft button, selectable indication, text entry, or other solicitation indication. The location corresponds to a location on or adjacent the medical image 52, in the background, on text 62, on a scale 60, or other location.

The user input may be associated with a plurality of locations. For example, the user input is a symbol or indicates motion. The user draws an enclosed shape, a spiral, a line, a curve, a combination of disconnected locations, or other combination of locations. The locations of the user input are sampled, or the path of travel of a user input is determined. The user input may be for a location free of solicitation indication, but also include other location selections based on subsequent solicitation.

In act 36, the user input is associated with context of the screen 50. The context of the screen 50 at the user selected location is determined. The user input is related to the context of the display. For example, the location is determined as on the medical image and/or on a portion of the medical image (e.g., center, edge, box or other portion). As another example, the location is determined as on text 62, on the scale 60, or other location on the screen 50 or in the background. The contextual association is general, such as the user selecting the image 52, or specific, such as the user selecting a particular word, letter, or sequence of text 62.

The context may be based on the known location of information from generating the screen. Alternatively, the screen data is processed to determine the context. For example, pattern recognition or correlation with templates or expected information is used to identify the context.

In act 38, the operation of the medical imaging system is set as a function of the association of the user input with the context. The association indicates the desired user alteration. Through training, instinct, or experimentation, the user input indicates a characteristic of the medical image to alter. The context indicates the desired parameter to be changed.

The parameter corresponds to an acquisition and/or imaging processing parameter. The medical imaging system is controlled for acquisition or image processing. For acquisition parameters, subsequent imaging is performed based on a new setting. For imaging processing parameters, the current image is reprocessed, or subsequent imaging is performed based on the new setting.

The control is performed as a function of the user input and the context. For example, a value associated with indicated text is altered. The association or context indicates at least the parameter to be altered, and may indicate the change to be made.

The association or context may indicate the alteration to be made to the parameter, such as turning a type of filtering on or off. Alternatively or additionally, further user input indicates the alteration. For example, once a user selects text to alter a parameter based on context, the user is solicited to enter a value or make an adjustment. As another example, a direction, velocity, acceleration, change in direction, symbol or other motion characteristic of the user input is used to indicate a magnitude, direction or other adjustment indication change in the setting of the parameter.

Referring to FIG. 3, some example contextual controls are provided. The user positions a pointer at or touches an edge 54, 56 of the medical image 52, and then moves the pointer (e.g., drag operation) or touch device (e.g., stylus or finger). The user input is associated with the edge 54, 56 of the image 52 as context, so the depth, scan pattern or scanned region parameters are adjusted. The direction and amount of motion of the user input indicates the change to the depth or scan region to be made. The image depth, field of view, or both are set based on the association of the user input with the displayed context.

Similar controls are provided for the box 58. By selecting an edge or corner of the box 58, the lateral and/or axial field of view is altered. By selecting a center of the box 58 and dragging, the position of the box may be moved relative to the medical image. By selecting a center of the medical image 52 and dragging, the scan region relative to the patient may be moved. A new box 58 may be drawn on the medical image, indicating activation of a color Doppler velocity or energy mode of imaging within the box 58. Alternatively, the new box 58 drawn on the medical image may indicate a zoom function. The field of view is adjusted to the zoomed region indicated by the user input box 58.

Where more than one operation may be associated with the context given a user input, a selection may be solicited from the user. The user may predefine or set meanings of specific inputs in context. Another option is user selection from a pop-up menu. This pop-up shows some candidate menus when the user context is ambiguous in some way. For example, if a user draws a rectangular box, then the system shows a menu including items for user selection. Example items may be: zoom in this area, change mode to color flow imaging on this region, change mode to 3-dimensional imaging on this region, or measure this area or volume.

Alternatively, a default parameter is altered or the user inserts further instructions or input. In another alternative, user input symbols, number of taps, speed, direction, magnitude, combination (e.g., left or right click with drag), or other input characteristic distinguishes between different possible parameters to be altered.

In one embodiment, symbols are used to indicate the adjustment with the context. User input of a symbol on the medical image 52, a portion of the medical image 52, or other location indicates the parameter to be adjusted and/or the amount or direction of adjustment. For example, the gain is set by a clockwise (e.g., increase) or counter clockwise (e.g., decrease) circular motion at or near a center of the medical image 52. As another example, a brightness or scale is adjusted by an up or downward straight motion at or near the center of the medical image 52. A motion along the scale 60 or tapping at a darker or lighter region of the scale 60 may indicate change of the scale (e.g., select a different color scale) or increase or decrease in brightness.

A direction of motion may indicate adjustment of a parameter with a range of settings. For example, the user selects the text 62 associated with frequency to control the imaging frequency. Motion to the left or down may indicate decreasing frequency, and motion to the right or up may indicate increasing frequency. The amount or range of motion may indicate the amount of frequency change.

In one embodiment, a combination of disconnected user inputs associated with context indicates a parameter to change. For example, the user sequentially taps a left edge 56 and then a right edge 56 of the image 52. The image 52 is then flipped or displayed as a mirror image. As another example, a double tap indicates freezing or selecting a specific image 52. While a sequence of images 52 are shown, the double tap stops the sequence or flags the selected image 52.

Time or depth gain control may be set based on context. The gain may be set differently for different depths. The depth within the image associated with user input is the depth for which gain is set. Based on motion or a combination of inputs (e.g., right click and dragging for increased gain and left click and dragging for decreasing gain), the gain at the selected depth is adjusted.

Soft buttons may be used in combination with association with context. For example, the user selects text for dynamic range. Left and right or up and down arrow buttons are generated on the screen in response to the contextual association of the user input with the dynamic range text. The user selects the soft buttons to increase or decrease the dynamic range.

Measurements may be triggered in response to association of the context with user inputs. For example, a user selects two points in the medical image. A distance between the two points relative to the patient is determined. As another example, the user traces an irregular outline on the medical image. An area within the outline is determined automatically. The measurements are determined without further user triggering, such as without the user depressing a distance, area, measurement or other function specific button.

In another example embodiment, voice recognition and touch screen inputs are used together. If a user speaks "3D" or other voice input and then or contemporaneously draws a rectangular box or other contextual input on the touch screen, the system changes operation, such as using the box region for 3-dimensional imaging or rendering. Similarly, a user can make the same result through drawing a rectangular box and writing letters "3D" on the touch screen. The system may be controlled or operated by using various interface methods.

Any single or combination of inputs and context may be used. Specific examples are given above, but may be different in different embodiments. For example, dynamic range may be adjusted by motion rather than soft buttons triggered by contextual association.

With contextual association, the user may directly select the function or imaging parameter to control. The selection is on the screen or medical image. By analyzing the context of the user selection, the user input system automatically adjusts the parameter or function. For imaging systems with limited input devices, such as handheld devices, contextual association may allow more options. For more complex systems, the user may find contextual control simpler or quicker than operation of complex user input devices.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for user interaction with a medical imaging system, the method comprising: displaying a screen having a medical image; receiving user input associated with a location on the screen, the location being free of a display of a user input option indicating the location as being for input of information to be used for future imaging; associating the user input with a context of the screen at the location; determining which of a plurality of different parameters to alter as a function of the association of the user input with the context of the screen at the location, different locations corresponding to different ones of the different parameters and being free of display of user input options; and setting operation of the medical imaging system as a function of the association of the user input with the context; wherein associating comprises determining the location as on text, the text comprising a sequence of letters or numbers representing one of the different parameters used to generate the medical image, the sequence representing a variable and a value for the variable, the variable being one of the different parameters for operation of the medical imaging system; and wherein setting comprises altering the value for the text in response to the association of the user input with the context of the screen at the location and altering the operation of the medical imaging system based on the altering of the value.

2. The method of claim 1 wherein displaying the screen comprises displaying the medical image and a background, the background having text associated with a current setting of the medical imaging system associated with the medical image.

3. The method of claim 1 wherein receiving user input comprises receiving input corresponding to a pointer position, a touch position, or both.

4. The method of claim 1 wherein being free of a display of a user input option comprises the location being free of a displayed soft button, selectable indication, and text entry indication.

5. The method of claim 1 wherein associating comprises determining the location as on the medical image.

6. The method of claim 5 wherein determining comprises identifying the location as a portion of the medical image.

7. The method of claim 1 wherein receiving user input comprises receiving a sequence of user inputs for a symbol; wherein setting comprises altering the operation as a function of the symbol and the association.

8. The method of claim 1 wherein displaying comprises displaying a medical diagnostic ultrasound image.

9. The method of claim 8 wherein receiving comprises receiving the user input associated with an edge of the medical diagnostic ultrasound image and motion; wherein associating comprises associating the user input with the edge of the medical diagnostic ultrasound image; and wherein setting comprises setting an image depth, field of view or both as a function of the association and the motion.

10. The method of claim 8 wherein receiving comprises receiving the user input associated with the medical diagnostic ultrasound image and a motion; wherein associating comprises associating the user input with the image; and wherein setting comprises setting a gain, brightness, or both for imaging as a function of the association and the motion.

* * * * *